Patented Nov. 9, 1943

2,333,810

UNITED STATES PATENT OFFICE 2,333,810

DEVULCANIZING RUBBER

Arthur Morrill Neal and James Ralph Schaffer, Wilmington, Del., assignors to E. I. du Pont de Nemours & Company, Wilmington, Del., a corporation of Delaware No Drawing. Application May 28, 1940, Serial No. 337,630

13 Claims. (Cl. 260—712)

This invention relates to rubber and more particularly to new and improved methods of devulcanizing rubber.

Reclaimed rubber is more and more finding a place in the rubber art not only because the reclaimed rubber is in general cheaper than natural rubber but also because of certain properties which are obtainable through the use of reclaimed rubber as a compounding ingredient and which are obtainable in no other manner.

There are two general methods used in the production of reclaimed rubber; these are: the open steam or pan process and the alkali process. The open steam or pan process is generally used in reclaiming rubber stock which contains little or no fabric, e. g., the reclaiming of old inner tubes. The alkali digestion process is used in reclaiming rubber which contains large amounts of fabric, e. g., the reclaiming of old rubber tires. In this process the fabric is destroyed by the use of sodium hydroxide. In carrying out this alkali digestion process, the rubber scrap is first finely ground and then loaded into an autoclave in the presence of an aqueous solution of sodium hydroxide. In general, concentrations of 4 to 6% of sodium hydroxide are used. The autoclave is then closed and heated to 178° to 198° C. The time of digestion varies from 8 hours for the higher temperature to 20 hours for the lower temperature. This treatment causes almost complete destruction and removal of the fabric. At the conclusion of this treatment, the autoclave is cooled down and the reclaimed rubber is washed well with water to remove the alkali and is then converted into a homogeneous mass either on a mill roll or in an internal mixer.

It has been proposed in the past to use many different softening agents in connection with the reclaiming process. These have been products such as the various oils, tars and pitches derived from the distillation of wood, petroleum or coal, also fatty acids and asphaltic base softeners. It has been found, however, that the use of such materials as softening agents for the reclaiming is relatively inefficient. Large quantities are required to effect any unusual softening of the reclaim and these large quantities of added substances produce reclaim stocks that are difficult to handle in practice. The tendency of the reclaimers has been to reduce materially or eliminate entirely the amount of these materials which are added to the reclaim.

B. S. Garvey in Patent 2,193,624 has proposed to improve the processes of devulcanizing rubber and particularly inner tube scrap by carrying out the reclaiming processes in the presence thiophenols. Such process operates quite satisfactorily under the conditions disclosed by Garvey particularly when inner tube scrap is treated. Inner tube scrap may even be reclaimed satisfactorily by use of the thiophenols even in the presence of substantial amounts of alkali.

We have found that the treatment of whole tire scrap presents different problems. Particularly, we have found that the thiophenols are ineffective as assistants for reclaiming whole tire scrap in the presence of substantial amounts of alkali, as in the normal alkali process. While we are not certain as to the exact reason for this phenomena, it appears most probable that it is due to the fact that whole tire scrap contains relatively large amounts of compounding ingredients and fillers, particularly carbon black, whereas inner tube scrap contains relatively small amounts of such compounding ingredients and fillers and generally no carbon black.

It is an object of the present invention to provide an improved method for devulcanizing rubber and particularly whole tire scrap. Another object is to provide a method for devulcanizing whole tire scrap, whereby devulcanized rubber, having a greater degree of devulcanization and an increased tendency to sheet out to a smooth sheet on a rubber mill, is obtained. A further object is to provide a method of rendering thiophenols effective in the devulcanization of whole tire scrap. A still further object is to provide a method of combining the thiophenol devulcanizing process with the alkali process to obtain an improved devulcanized rubber from whole tire scrap. Other objects are to provide new compositions of matter and to advance the art. Still other objects will appear hereinafter.

The above and other objects of our invention may be accomplished by subjecting whole tire scrap separately to the action of a small proportion of a thiophenol at temperatures of from about 150° C. to about 200° C. for a sufficient length of time to materially devulcanize the rubber and to the action of a dilute aqueous solution of sodium hydroxide at from about 160° C. to about 200° C. for a sufficient length of time to substantially destroy fabric in the rubber. The treatment with the thiophenol may follow the treatment with the sodium hydroxide solution, but, in such case, it is essential to wash most of the alkali from the rubber prior to treatment with the thiophenol. When the treatment with the thiophenol precedes the treatment with the sodium hydroxide, no intermediate washing step is necessary but the sodium hydroxide treatment may follow the thiophenol treatment without interruption or intermediate handling of the product. We have found that, by such combination of steps, the thiophenol is rendered effective to substantially devulcanize the whole tire scrap and the resulting devulcanized rubber has a greater degree of devulcanization and an increased tendency to sheet out as a smooth sheet on a rubber mill than could be obtained by either step alone and than would be expected from the results obtained from the individual steps.

By the term "whole tire scrap," we mean rubber tires which have been ground or broken up into relatively small pieces. Usually, the rubber tires will be ground, as is usual in reclaiming processes.

The term "a thiophenol," as employed herein and in the claims, will be understood to mean an aromatic compound containing a sulfhydryl (—SH) radical in which the sulfur is bonded directly to a carbon atom in in the aromatic ring. In other words, they are phenols in which a phenolic oxygen has been replaced by a sulfur atom. The aromatic ring may contain substituents such as alkyl, hydroxyl, halogen, additional sulfhydryl groups and the like. The thiophenols may contain one, two or more benzene rings, but preferably will contain from one to two benzene rings and particularly a single benzene ring. Representative aromatic groups are phenyl, tolyl, xylyl, biphenyl, naphthyl, methyl, naphthyl, anthracyl, diphenyl-methane and like groups. Preferably, the thiophenol will be one which, except for the sulfur of the mercaptan group, consists of carbon and hydrogen, and, of these, the alkylated thiophenols, containing only one benzene ring and particularly those in which the alkyl groups are lower alkyl groups, will be preferred. By "lower alkyl groups," as used herein, we mean saturated aliphatic hydrocarbon radicals containing from 1 to 6 carbon atoms. Suitable alkyl groups are methyl, ethyl, propyl and butyl. Amongst the compounds which we have found to be particularly satisfactory for our purpose are xylyl mercaptan, para-thio-cresol, ortho-thio-cresol, thio-alpha-naphthol and thio-beta-naphthol. Of these xylyl mercaptan is preferred. By the term "xylyl mercaptan," as employed herein and in the claims, we mean the technical mixture of isomers prepared from the technical mixture of isomeric xylenes.

The thiophenols may be used in the proportion of from about 0.05% to about 5% by weight, based on the rubber scrap. In most instances, we prefer to employ from about 0.1 to about 1% of thiophenol, based on the rubber scrap.

Generally, the treatment with the thiophenols will be effected at temperatures of from about 150° C. to about 200° C. and preferably from about 150° C. to about 175° C. However, when the treatment with the thiophenol is caused to take place in the presence of large amounts of water and sodium hydroxide is to be added to the reaction mass immediately upon completion of the desired action of the thiophenol, the action of the thiophenol will preferably be caused to take place at temperatures of from about 175° C. to about 190° C. The action of the sodium hydroxide will generally be caused to take place at temperatures of from about 160° C. to about 200° C. and preferably from about 175° C. to about 190° C.

There has been considerable discussion in the literature as to what is the best method for determining the efficiency of any reclaiming process. The consensus of opinion seems to be that the degree of devulcanization is intimately connected with the percent of chloroform extract in the reclaimed rubber and this method has been used as a criterion of the increase in devulcanization brought about through the use of our invention. Chloroform extractions were made on samples of products, prepared both in the presence and in the absence of the thiophenols. The percent of increase in devulcanization was calculated by using the following formula:

$$\frac{(A-B)\times 100}{B} = \% \text{ increase in devulcanization}$$

where A=the weight of the chloroform extract of the product obtained through the aid of the thiophenols and B represents the weight of the chloroform extract of the product obtained in the absence of the thiophenols.

In carrying out the chloroform analysis, 10 grams of the material was first extracted with acetone in a Soxhlet apparatus for 24 hours. The purpose of the acetone extraction was to remove any rubber resins or softening agents which might be present in the compound and which might affect the chloroform extract through their solubility in chloroform. The rubber, which had been acetone extracted, was then extracted with chloroform for 48 hours in the same type of apparatus. The chloroform was then evaporated off and the weight of the chloroform extract determined by evaporating to constant weight in a 50° C. oven.

In order to illustrate our invention more clearly, the preferred modes of carrying the same into effect and the advantageous results to be obtained thereby, the following examples are given:

EXAMPLE I

*Pan-alkali process*

300 grams of ground whole tire scrap were placed in an enameled pan and mixed with 1.5 grams of xylyl mercaptan introduced in the form of a 36% solution in kerosene. The enameled pan was covered with a lid and heated in open steam at 80 pounds square inch pressure for 18 hours. At the end of this period, the steam pressure was released, the pan and charge was cooled, and the mass was removed from the pan and charged into an autoclave equipped with agitation. 780 grams of a 5% solution of sodium hydroxide were then added. The autoclave was closed and the mass heated with agitation to 180° C. for 12 hours. The autoclave was then cooled and the reclaim removed. The rubber mass was separated from the solution and washed with water. It was then placed on an ordinary rubber wash mill and washed with water until the wash water was no longer alkaline. The reclaimed rubber was then dried on an ordinary smooth roll rubber mill and drawn out into a thin sheet. The chloroform extract was determined on this sample in the manner hereinbefore described.

EXAMPLE II

This example was exactly the same as Example I, except that no xylyl mercaptan was used in the process. In order to avoid variations in results due to any effect of the kerosene, a weight of kerosene, equal to that introduced in Example I, was added to this control example. The increase in devulcanization of Example I over Example II, as calculated by the formula given hereinbefore, was 27.7%.

Another test was run, repeating Example I and Example II but using 1% of xylyl mercaptan instead of the ½% previously used. The increase in devulcanization, brought about by the use of xylyl mercaptan in this case, was 46%.

EXAMPLE III

*Alkali-pan process*

600 grams of ground whole tire scrap and 1560 grams of a 5% sodium hydroxide solution were charged into an autoclave and heated with agitation to 180° C. for 12 hours. The reclaimed rubber was filtered, washed and dried on the ordinary rubber mill, as described in Example I. 150 grams of this product were torn into small pieces and mixed with 1.5 grams of xylyl mercaptan, introduced in the form of a 36% solution in kerosene. This mixture was then heated in covered enameled pans at 80 pounds/square inch steam pressure for 18 hours. The reclaim was then milled into a thin sheet on a 70° C. mill. The chloroform extract of this reclaim was determined in the standard manner.

EXAMPLE IV

This was exactly the same as Example III, except that no xylyl mercaptan was used. As in the case of the other control examples, a weight of kerosene, equal to that added along with the xylyl mercaptan in Example III, was added to this control. The increase in devulcanization of Example III over Example IV, as calculated by the formula hereinbefore given, was 83.2%.

EXAMPLE V

Modified alkali process

A mixture of 300 grams of ground whole tire scrap, 740 grams of water and 1.5 grams of xylyl mercaptan, introduced as a 36% solution in kerosene, was charged into an autoclave equipped with agitation and heated to 180° C. for 12 hours. The autoclave was then cooled to 30 ± 5° C. and 134 grams of a 30% solution of sodium hydroxide were added. The mixture was then heated to 180° C. and held for 12 hours. The autoclave was then cooled. The reclaim was removed from the autoclave, washed free of caustic on a rubber wash mill and finally dried and sheeted out on an ordinary rubber mill. The chloroform extract of this sample was determined by the standard procedure.

EXAMPLE VI

This example was identical with Example V, except that no xylyl mercaptan was added. As in the case of the other control examples, a weight of kerosene, equal to that added in the kerosene solution of xylyl mercaptan in Example V, was added to this charge. The increase in devulcanization of Example V over Example VI, as calculated by the formula hereinbefore given, was 49.6%.

Other experiments, similar to those of Example V and Example VI using the "modified alkali reclaiming process," were carried out in which other aryl mercaptans were substituted for the xylyl-mercaptan of Example V. The results of these tests are tabulated in Table I.

Table I

| Peptizing agent | Per cent weight based on rubber | Per cent increase in devulcanization |
|---|---|---|
| Para-thio-cresol | 0.5 | 41.4 |
| Ortho-thio-cresol | 0.5 | 25 |
| Crude thio-alpha-naphthol | 0.58 | 56.3 |
| Thio-beta-naphthol | 0.5 | 28 |

A series of experiments were carried out as in Example V in which the amount of xylyl mercaptan, used in the "modified alkali process," was varied. The results of this series of tests are given in Table II.

Table II

| Peptizing agent | Per cent weight based on rubber | Per cent increase in devulcanization |
|---|---|---|
| Xylyl mercaptan | 0.5 | 49.6 |
| Do | 0.108 | 32.8 |
| Do | 0.05 | 12.7 |

These results show quite conclusively that the use of as small an amount of xylyl mercaptan as 0.05% still results in a very marked increase in the amount of devulcanization obtained by the "modified alkali process."

The modified alkali process of Example V and further illustrated in Tables I and II constitutes the preferred embodiment of our invention.

In order to illustrate more clearly the differences between inner tube scrap and whole tire scrap, the different problems involved and the advantages of our invention, the following examples are given:

EXAMPLE VII 150 grams of ground red inner tube scrap, 390 g. of 5% sodium hydroxide solution and 1.5 g. of xylyl-mercaptan, introduced in the form of a 36% solution in kerosene, were charged into an autoclave equipped with agitation and heated to 180° C. for 12 hours. The autoclave was then cooled, the reclaim removed, washed free of caustic on a rubber wash mill and finally dried and sheeted out on an ordinary rubber mill. The chloroform extract of this sample was determined by the standard procedure.

EXAMPLE VIII

This example was identical with Example VII, except that no xylyl-mercaptan was added. As in the case of the other control samples, a weight of kerosene, equal to that added in the kerosene solution of xylyl-mercaptan in Example VII, was added to this charge. The increase in devulcanization of Example VII over Example VIII, calculated by the formula given above, was 40%.

EXAMPLE IX 150 grams of ground whole tire scrap, 390 g. of 5% sodium hydroxide solution and 1.5 g. of xylyl-mercaptan, introduced as a 36% solution in kerosene, were charged into an autoclave equipped with agitation and heated to 180° C. for 12 hours. The autoclave was then cooled, the reclaim removed and washed free of caustic on a rubber wash mill. It was finally dried and sheeted out on an ordinary rubber mill and the chloroform extract of this reclaim determined by the standard procedure.

EXAMPLE X

This example was identical with Example IX, except that no xylyl-mercaptan was added. As in the case of the other control samples, a weight of kerosene, equal to that added in the kerosene solution of xylyl-mercaptan in Example IX, was added to this charge. The increase in devulcanization of Example IX over Example X, calculated by the formula given above, was 0%.

EXAMPLE XI

The process of Example IX was repeated, varying the amount of xylyl-mercaptan and the times and temperatures of treatment. The results are shown in the following Table III:

*Table III*

| Per cent of xylyl-mercaptan used | Hours of digestion | Temperature of digestion, °C. | Per cent increase in devulcanization |
|---|---|---|---|
| 0.5 | 12 | 180 | −5 |
| 1.0 | 12 | 180 | −3 |
| 1.0 | 7½ | 180 | −9 |
| 1.0 | 12 | 210 | −4 |

From Examples 9 to 11 inclusive, it will be apparent that the thiophenols are substantially ineffective to devulcanize whole tire scrap in the presence of substantial amounts of alkali. By a comparison of such examples with Examples 1 to 6 inclusive, it will be apparent that by our invention we have solved the problem and made it possible to obtain the advantages of both the thiophenol process and the alkali process in the treatment of whole tire scrap.

While we have disclosed the preferred embodiments of our invention and the preferred modes of carrying the same into effect, it will be readily apparent to those skilled in the art that many variations and modifications may be made therein without departing from the spirit of our invention. The above examples are given for illustrative purposes only and we intend to claim our invention broadly as in the appended claims. Other thiophenols may be substituted for those illustrated in the examples. Some of such other thiophenols are:

Thiophenol
Mercapto-ortho-cresol
1-mercapto-2-naphthol
Dithio-resorcinol
Mono-thio-catechol
Meta-chloro-thiophenol
Para-phenyl-thiophenol
4-mercapto-diphenyl-methane
2,3-dimercapto-naphthalene
1,5-dimercapto-naphthalene
2-mercapto-anthracene
Ethyl-thiophenols
Propyl-thiophenols
Butyl-thiophenols
Stearyl-thiophenols
Thio-salicylic acid
Para-hydroxy-thiophenol Still other thiophenols will occur to those skilled in the art. Also mixtures of two or more thiophenols may be employed. Usually, it will be preferred to employ mixtures such as technical mixtures of xylyl mercaptans and technical mixtures of thio-cresols as ordinarily produced in syntheses of such compounds.

We claim:

1. The method of devulcanizing rubber which comprises subjecting whole tire scrap separately to the action of a small proportion of a thiophenol at temperatures of from about 150° C. to about 200° C. for a sufficient length of time to materially devulcanize the rubber and to the action of a dilute aqueous solution of sodium hydroxide at from about 160° C. to about 200° C. for a sufficient length of time to substantially destroy fabric in the rubber.

2. The method of devulcanizing rubber which comprises subjecting whole tire scrap separately to the action of a small proportion of a thiophenol containing from one to two benzene rings and which, except for the sulphur of the mercaptan group, consists of carbon and hydrogen at temperatures of from about 150° C. to about 200° C. for a sufficient length of time to materially devulcanize the rubber and to the action of a dilute aqueous solution of sodium hydroxide at from about 175° C. to about 190° C. for a sufficient length of time to substantially destroy fabric in the rubber.

3. The method of devulcanizing rubber which comprises subjecting whole tire scrap separately to the action of a small proportion of xylyl mercaptan at temperatures of from about 150° C. to about 200° C. for a sufficient length of time to materially devulcanize the rubber and to the action of a dilute aqueous solution of sodium hydroxide at from about 160° C. to about 200° C. for a sufficient length of time to substantially destroy fabric in the rubber.

4. The method of devulcanizing rubber which comprises subjecting whole tire scrap consecutively to the action of a small proportion of a thiophenol at temperatures of from about 150° C. to about 200° C. for a sufficient length of time to materially devulcanize the rubber and then to the action of a dilute aqueous solution of sodium hydroxide at from about 160° C. to about 200° C. for a sufficient length of time to substantially destroy fabric in the rubber.

5. The method of devulcanizing rubber which comprises subjecting whole tire scrap consecutively to the action of a small proportion of a thiophenol containing from one to two benzene rings and which, except for the sulfur of the mercaptan group, consists of carbon and hydrogen at temperatures of from about 150° C. to about 200° C. for a sufficient length of time to materially devulcanize the rubber and then to the action of a dilute aqueous solution of sodium hydroxide at from about 175° C. to about 190° C. for a sufficient length of time to substantially destroy fabric in the rubber.

6. The method of devulcanizing rubber which comprises subjecting whole tire scrap to the action of a small proportion of a thiophenol in the presence of water and at temperatures of from about 150° C. to about 200° C. for a sufficient length of time to materially devulcanize the rubber, then adding an aqueous solution of sodium hydroxide to form with the water a dilute solution of sodium hydroxide and then heating the mixture at from about 160° C. to about 200° C. for a sufficient length of time to substantially destroy fabric in the rubber.

7. The method of devulcanizing rubber which comprises subjecting whole tire scrap to the action of a small proportion of a thiophenol containing from one to two benzene rings and which, except for the sulfur of the mercaptan group, consists of carbon and hydrogen in the presence of water and at temperatures of from about 150° C. to about 200° C. for a sufficient length of time to materially devulcanize the rubber, then adding an aqueous solution of sodium hydroxide to form with the water a dilute solution of sodium hydroxide and then heating the mixture at from about 160° C. to about 200° C. for a sufficient length of time to substantially destroy fabric in the rubber.

8. The method of devulcanizing rubber which comprises subjecting whole tire scrap to the action of a small proportion of a thiophenol containing only one benzene ring and which, except for the sulfur of the mercaptan group, consists of carbon and hydrogen in the presence of water and at temperatures of from about 150° C. to about 200° C. for a sufficient length of time to materially devulcanize the rubber, then adding an aqueous solution of sodium hydroxide to form with the water a dilute solution of sodium hydroxide and then heating the mixture at from about 160° C. to about 200° C. for a sufficient length of time to substantially destroy fabric in the rubber.

9. The method of devulcanizing rubber which comprises subjecting whole tire scrap to the action of a small proportion of an alkylated thiophenol containing only one benzene ring and which, except for the sulfur of the mercaptan group, consists of carbon and hydrogen and in which the alkyl groups are lower alkyl groups in the presence of water and at temperatures of from about 150° C. to about 200° C. for a sufficient length of time to materially devulcanize the rubber, then adding an aqueous solution of sodium hydroxide to form with the water a dilute solution of sodium hydroxide and then heating the mixture at from about 160° C. to about 200° C. for a sufficient length of time to substantially destroy fabric in the rubber.

10. The method of devulcanizing rubber which comprises subjecting whole tire scrap to the action of a small proportion of a thiophenol containing only one benzene ring having substituted thereon only one mercaptan group and one to two methyl groups in the presence of water and at temperatures of from about 150° C. to about 200° C. for a sufficient length of time to materially devulcanize the rubber, then adding an aqueous solution of sodium hydroxide to form with the water a dilute solution of sodium hydroxide and then heating the mixture at from about 160° C. to about 200° C. for a sufficient length of time to substantially destroy fabric in the rubber.

11. The method of devulcanizing rubber which comprises subjecting whole tire scrap to the action of a small proportion of zylyl mercaptan in the presence of water and at temperatures of from about 150° C. to about 200° C. for a sufficient length of time to materially devulcanize the rubber, then adding an aqueous solution of sodium hydroxide to form with the water a dilute solution of sodium hydroxide and then heating the mixture at from about 160° C. to about 200° C. for a sufficient length of time to substantially destroy fabric in the rubber.

12. The method of devulcanizing rubber which comprises subjecting whole tire scrap separately to the action of a small proportion of thio-alpha-naphthol at temperatures of from about 150° C. to about 200° C. for a sufficient length of time to materially devulcanize the rubber and to the action of a dilute aqueous solution of sodium hydroxide at from about 160° C. to about 200° C. for a sufficient length of time to substantially destroy fabric in the rubber.

13. The method of devulcanizing rubber which comprises subjecting whole tire scrap separately to the action of a small proportion of thio-beta-naphthol at temperatures of from about 150° C. to about 200° C. for a sufficient length of time to materially devulcanize the rubber and to the action of a dilute aqueous solution of sodium hydroxide at from about 160° C. to about 200° C. for a sufficient length of time to substantially destroy fabric in the rubber.

ARTHUR MORRILL NEAL.
JAMES RALPH SCHAFFER.